(12) United States Patent
Okabayashi

(10) Patent No.: US 9,250,861 B2
(45) Date of Patent: Feb. 2, 2016

(54) RANDOM NUMBER GENERATING DEVICE

(71) Applicant: MAKITA CORPORATION, Anjo-shi, Aichi (JP)

(72) Inventor: Hisakazu Okabayashi, Anjo (JP)

(73) Assignee: MAKITA CORPORATION, Anjo-Shi (JP)

( * ) Notice: Subject to any disclaimer, the term of this patent is extended or adjusted under 35 U.S.C. 154(b) by 393 days.

(21) Appl. No.: 13/738,051

(22) Filed: Jan. 10, 2013

(65) Prior Publication Data

US 2013/0191428 A1 Jul. 25, 2013

(30) Foreign Application Priority Data

Jan. 19, 2012 (JP) .................. 2012-009015

(51) Int. Cl.
*G06F 7/58* (2006.01)
(52) U.S. Cl.
CPC ............... *G06F 7/582* (2013.01); *G06F 7/588* (2013.01)
(58) Field of Classification Search
CPC ......... G06F 7/588; G06F 7/582; G06F 7/584; G06F 7/586; H03K 3/84
USPC ........................................ 708/251
See application file for complete search history.

(56) References Cited

U.S. PATENT DOCUMENTS

| 5,204,671 | A * | 4/1993 | Kronberg .................. 340/12.18 |
| 7,516,169 | B2 | 4/2009 | Collier |
| 7,941,865 | B2 | 5/2011 | Seman, Jr. et al. |
| 2003/0006849 | A1 | 1/2003 | Janssen |
| 2008/0016135 | A1 * | 1/2008 | Janke et al. .................. 708/251 |
| 2008/0037779 | A1 | 2/2008 | Seman, Jr. et al. |
| 2008/0294707 | A1 | 11/2008 | Suzuki et al. |
| 2012/0235628 | A1 | 9/2012 | Okabayashi et al. |

FOREIGN PATENT DOCUMENTS

| DE | 10003472 C1 | 4/2001 |
| JP | H06-319171 A | 11/1994 |
| JP | 2003-521062 A | 7/2003 |
| JP | B2-3492494 | 11/2003 |
| JP | 2008-293167 A | 12/2008 |
| JP | 2011-135740 A | 7/2011 |

OTHER PUBLICATIONS

May 14, 2013 European Extended Search Report issued in European Patent Application No. EP 13151412.7.
Extended European Search Report issued in European Patent Application No. 13151412.7 on Sep. 11, 2013.
Jul. 14, 2015 Notice of Reasons for Rejection issued in Japanese Application No. 2012-009015.

* cited by examiner

*Primary Examiner* — Tan V. Mai
(74) *Attorney, Agent, or Firm* — Oliff PLC

(57) ABSTRACT

A random number generating device includes: a microcomputer; a first oscillator circuit that has a predetermined temperature characteristic and generates a clock serving as a basis of a behavior of the microcomputer; and an electronic circuit that has a temperature characteristic being different from the predetermined temperature characteristic of the first oscillator circuit and operates in accordance with a command from the microcomputer. The microcomputer measures an operating time of the electronic circuit based upon the clock generated by the first oscillator circuit and generates a random number based upon a result of the measurement.

4 Claims, 9 Drawing Sheets

RANDOM NUMBER GENERATING DEVICE

CROSS-REFERENCE TO RELATED APPLICATIONS

This application claims the benefit of Japanese Patent Application No. 2012-9015 filed Jan. 19, 2012 in the Japan Patent Office, the disclosure of which is incorporated herein by reference.

BACKGROUND

The present invention relates to a random number generating device that generates a random number by the behavior of a microcomputer.

When electrically-powered equipment (electric power tools, electrically operated machines, and so on), which operate in response to power supply from batteries, and battery chargers, which charge batteries, are mounted with batteries that are not regular or appropriate, sometimes, the equipment get broken, or the batteries abnormally generate heat.

Accordingly, this type of equipment has been known in which, when the battery is mounted on the equipment, a random number is employed to determine (certify) whether or not the mounted battery is appropriate (e.g., see Specification of U.S. Pat. No. 7,941,865).

Specification of U.S. Pat. No. 7,941,865 suggests employing, as the random number, noise bits (low-order hits) being an AD converted value obtained by an A/D converter.

Further, a random number generating circuit that generates a random number is known in which a voltage control oscillator generates oscillation outputs by receiving unstable power source voltage, the oscillation outputs are counted for a predetermined period of time, and the counted value of the oscillation outputs is outputted as a random number (e.g., see JP3492494).

SUMMARY

However, the above-described ways of generating a random number are each achieved by utilizing property variations created due to fluctuations in the power supply voltage at the A/D converter or the voltage control oscillator. Accordingly, there is a problem that it is difficult for a microcomputer by itself to generate a random number because such microcomputers function in response to stabilized power supply voltage from a stabilized power source.

If an A/D converter or a voltage control oscillator is externally attached to a microcomputer and its power source is unstable and different from the stable power source for the microcomputer, it is possible to generate a random number by calculation process of the microcomputer.

However, in this case, the configuration as the random number generating device, is complicated, and its manufacturing cost may rise.

According to an aspect of the present invention, a random number generating device is provided, which can generate a random number by calculation process of a microcomputer with no use of an external circuit in which an output varies in response to fluctuations in power supply voltage.

The structure of the random number generating device of the present invention will be described below.

The random number generating device is configured with a microcomputer; a first oscillator circuit that generates a clock serving as a basis of a behavior of the microcomputer; and an electronic circuit that has a temperature characteristic being different from the one of the first oscillator circuit. The microcomputer generates a random number by measuring an operating time of the electronic circuit based upon the clock from the first oscillator circuit.

That is, the random number generating device of the present invention does not generate a random number by use of fluctuations in power-supply voltage as in the above-described conventional device but generate a random number by making use of the difference in temperature characteristics of the first oscillator circuit, which generates an operation clock, and the electronic circuit, which is operated in accordance with a command from the microcomputer.

Therefore, according to the present invention, a random number can be generated through the computing process of the microcomputer and by use of a built-in circuit or a peripheral circuit of the microcomputer. There is no need to externally attach a circuit as in the conventional device, to the microcomputer, of which outputs vary depending on fluctuations in power-supply voltage. As a result, according to the present invention, it is possible to achieve the random number generating device easily and at a low manufacturing cost.

Here, the electronic circuit of the present invention may be formed with a second oscillator circuit that exhibits higher temperature dependence than the first oscillator circuit, and the microcomputer may generate the random number by measuring the number of oscillations (oscillation frequency) of the second oscillator circuit based upon the clock from the first oscillator circuit.

Alternatively, the electronic circuit may be formed with a second oscillator circuit that exhibits a higher temperature dependence than the first oscillator circuit, and the microcomputer may generate the random number by measuring, based upon the clock from the first oscillator circuit, a period of time until the number of oscillations oscillation frequency) of the second oscillator circuit reaches a predetermined value.

That is, some microcomputers are each provided with a sub oscillator circuit, which generates a sub clock for detecting an wake-up timing during a sleep mode, separately from a main oscillator circuit that generates a clock referred as a basis of the behavior of the device. Precision is not required to the sub oscillator circuit as much as to the main oscillator circuit, and a device, which more temperature dependent than the main oscillator circuit, is usually employed as the sub oscillator circuit.

Regarding the random generating devices described above, in a case where the microcomputer is provided with the sub oscillator circuit described above, a random number is generated by employing the sub oscillator circuit as the second oscillator circuit.

As a result, a random number can be generated with no use of providing an external circuit for a random number generation to the microcomputer having the sub oscillator circuit, thereby enabling to achieve the random number generating device at a low manufacturing cost.

Alternatively, the electronic circuit may be configured with a charge-discharge circuit having a resistor and a capacitor connected in series to each other. In this case, the microcomputer may generate the random number by measuring, based upon the clock from the first oscillator circuit, a period of time until a voltage between both ends of the capacitor in the charge-discharge circuit reaches a specified voltage from 0V.

In this configuration, the microcomputer is needed to be provided with the charge-discharge circuit. However, since the charge-discharge circuit can be constructed of the resistor and the capacitor, comparing with a conventional device externally attached with an A/D converter or a voltage control oscillator, the random number generating device can be achieved at a low manufacturing cost.

Further, in a case where the microcomputer is provided with an output port connected to a pull-up resistor, the charge-discharge circuit can be structured only by connecting a capacitor to the output port. Therefore, a random number generating device using the charge-discharge circuit can be achieved more easily.

Still further, it is preferable that the random number generating device is mounted on at least one of an electric power tool, an electrically operated machine, a battery attached to the electric power tool or the electrically operated machine, and a battery charger for charging the battery.

In this case, according to the electric power tool, the electrically operated machine, or the battery charger, a random number, which is employed to determine (certify) whether the battery is proper, can be generated by the microcomputer embedded in these equipment or the battery.

BRIEF DESCRIPTION OF THE DRAWINGS

The present invention will now be described by way of example with reference to the accompanying drawings, in which.

DETAILED DESCRIPTION OF THE PREFERRED EMBODIMENTS

First Embodiment

A random number generating device of the first embodiment is achieved as a function of a battery charger 30 that initiates electrically charging a battery pack 10 mounted thereon. Specifically, the random number generating device determines (certifies) whether or not the battery pack 10 is an approved one when the battery pack 10 is mounted on the battery charger 30. The random number generating device, i.e., the battery charger 30 initiates electrically charging the battery pack 10 when the battery pack 10 is determined to be an approved one.

Figure 1:
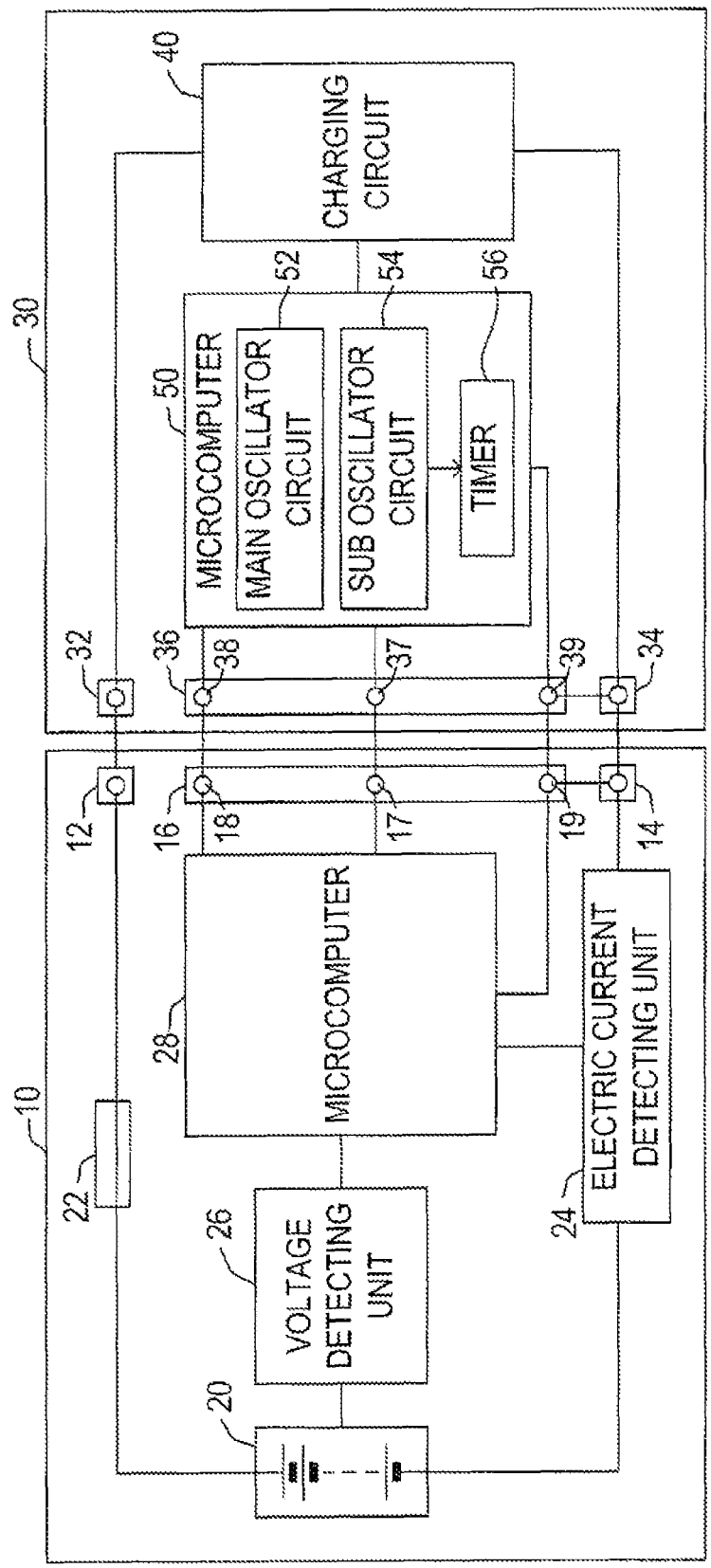
FIG. 1 is a block diagram illustrating a skeleton configuration of a battery pack and a battery charger according to a first embodiment.

As illustrated in FIG. 1, the battery pack 10 is provided with a battery 20 and power supply terminals 12 and 14. The battery 20 is configured with multiple battery cells connected in series. The power supply terminals 12 and 14 connects respectively positive and negative electrodes of the battery 20 to an object to be supplied with power, such as an electric power tool, an electrically operated machine, or the battery charger 30.

The battery pack 10 is further provided with a voltage detecting unit 26 and an electric current detecting unit 24. The voltage detecting unit 26 detects a voltage of the battery 20. The electric current detecting unit 24 detects a discharging current flowing from the battery 20 to a subject equipment to be supplied with power (for example, electric power tool or electrically operated machine, and hereinafter referred to as power-supplied equipment) and a charging current supplied from the battery charger 30 to the battery 20.

Detection signal outputted from each of the voltage detecting unit 26 and the electric current detecting unit 24 is inputted to a microcomputer 28 principally configured with a CPU, a ROM, a RAM and so on.

The microcomputer 28 monitors the state of the battery 20 and the charging-discharging current based upon the detection signal outputted from each of the voltage detecting unit 26 and the electric current detecting unit 24 and sends the monitoring result to the power-supplied equipment or to the battery charger 30. The microcomputer 28 functions in the ways described above so as to allow the battery 20 to charge and discharge appropriately.

The battery pack 10 is still further provided with a connecting terminal 16 for connecting the microcomputer 28 to a microcomputer that is a control circuit of the power-supplied equipment or the battery charger 30. This connecting terminal 16 consists of a data input-output terminal 17, a constant voltage terminal 18, and a ground terminal 19.

The data input-output terminal 17 is a terminal via which data is received and transmitted between the microcomputer 28 and the microcomputer of the power-supplied equipment or of the battery charger 30.

The constant voltage terminal 18 is a terminal via which a power-supply voltage (constant voltage), which is generated at a constant voltage power circuit (not illustrated) provided at the microcomputer 28, is supplied to the microcomputer of the power-supplied equipment, and a power-supply voltage (constant voltage) supplied from a microcomputer 50 of the battery charger 30 is inputted to the microcomputer 28.

The ground terminal 19 is a terminal to match a ground potential of the microcomputer 28 with the one of the microcomputer of the power-supplied equipment or of the battery charger 30. The ground terminal 19 is connected to the power supply terminal 14 connected to the negative electrode of the battery 20.

Further, in the battery pack 10, a fuse 22 is provided in a current pathway running from the positive electrode of the battery 20 to the power supply terminal 12. An overcurrent may cause the fuse 22 to melt.

The battery charger 30 is provided with power supply terminals 32, 34, and a connecting terminal 36. When the battery pack 10 is mounted on the battery charger 30, the power supply terminals 32 and 34 are respectively connected to the power supply terminals 12 and 14, and the connecting terminal 36 is connected to the connecting terminal 16.

A charging circuit 40 is connected to the power supply terminals 32 and 34 and serves to electrically charge the battery 20 of the battery pack 10 by receiving electric power supplied from an external power source (not illustrated). The microcomputer 50 is connected to the connecting terminal 36 and serves to control the charging circuit 40.

The microcomputer 50 receives a battery voltage and a charging current from the microcomputer 28 of the battery pack 10 via a data input-output terminal 37 of the connecting terminal 36 and the data input-output terminal 17 of the battery pack 10. The microcomputer 50 then controls the charging circuit 40 based upon the battery voltage and the charging current received as described above.

The microcomputer 50 operates by receiving power-supply voltage (constant voltage) from the constant voltage power circuit (not illustrated) of the charging circuit 40. The microcomputer 50 then supplies the power-supply voltage (constant voltage) to the microcomputer 28 of the battery pack 10 via a constant voltage terminal 38 of the connecting terminal 36 and the constant voltage terminal 18 of the battery pack 10.

Potential equalization is achieved between the ground potential of the microcomputer 50 and the one of the microcomputer 28 of the battery pack 10 via a ground terminal 39 of the connecting terminal 36 and the ground terminal 19 of the battery pack 10. The ground terminal 39 is also connected to the power supply terminal 34 connected to the negative electrode of the battery 20.

Embedded in the microcomputer 50 of the battery charger 30 are: a main oscillator circuit 52, a sub oscillator circuit 54, and a timer 56. The main oscillator circuit 52 generates a main clock serving as a basis of the behavior or operation of the microcomputer 50. The sub oscillator circuit 54 generates a sub clock having a frequency lower than the one of the main clock. The timer 56 measures time by counting the sub clock outputted from the sub oscillator circuit 54.

The main oscillator circuit 52 is provided with a ceramic oscillator as a oscillator source, and the oscillation frequency thereof is set, for example, to a frequency at several MHz. Accordingly, the main oscillator circuit 52 is always stable without being influenced by temperature changes and can generate a main clock.

The sub oscillator circuit 54 is used to allow the timer 56 to measure time needed for the microcomputer 50 in a sleep mode to wake up periodically. High precision of oscillation frequency is not required to the sub oscillator circuit 54 as much as the main oscillator circuit 52.

Therefore, a circuit (e.g., CR oscillator circuit) is employed for the sub oscillator circuit 54, which is temperature-dependent more than the main oscillator circuit 52, and, as a result, its oscillation frequency easily varies depending on temperature changes, but which is manufactured at a low cost. The oscillation frequency of the sub oscillator circuit 54 is lower than the one of the main oscillator circuit 52 and is set to a frequency at several dozen kHz.

The microcomputer 28 of the battery pack 10 is also embedded with such a oscillator circuit and a timer. But, these units do not serve as a main section related to the present invention, and the explanation thereof will be omitted.

By use of the battery charger 30 configured as described above, the certification of the battery pack 10 is implemented as below.

The microcomputer 50 of the battery charger 30 transmits, to the microcomputer 28 of the battery pack 10, authentication data that is generated by adding a predetermined encoded data to a random number. After that the microcomputer 50 of the battery charger 30 then obtains, from the microcomputer 28, response data generated based upon the authentication data and authenticates or certifies the battery pack 10 based upon the response data.

The microcomputer 50 of the battery charger 30 uses the sub oscillator circuit 54 and the timer 56 to generate the random number required to perform such an authentication process.

A random number generating process implemented by the microcomputer 50 of the battery charger 30 is described below with reference to the flowchart illustrated in FIG. 2. The random number generating process is implemented to generate a random number.

An authentication process, which uses a random number to authenticate the battery pack 10, is described in detail in JP2011135740, for example. However, the authentication process described therein is not a main point of the present invention and the explanation thereof will be omitted.

Figure 2:
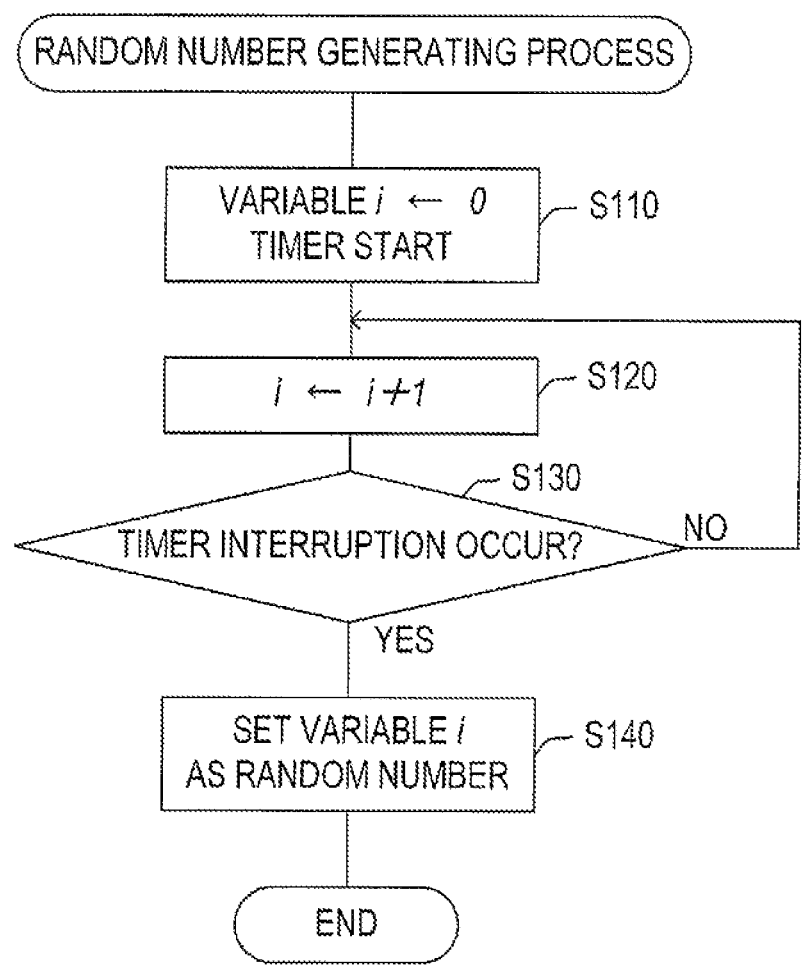
FIG. 2 is a flowchart illustrating a random number generating process implemented by a microcomputer of the first embodiment.

As illustrated in FIG. 2, once the microcomputer 50 (specifically CPU) initiates the random number generating process, the process first proceeds to S110 (S stands for step), wherein the microcomputer 50 sets a default value "0" to a variable i and allows the timer 56 to initiate measuring time (the timer 56 starts timing).

Figure 3:
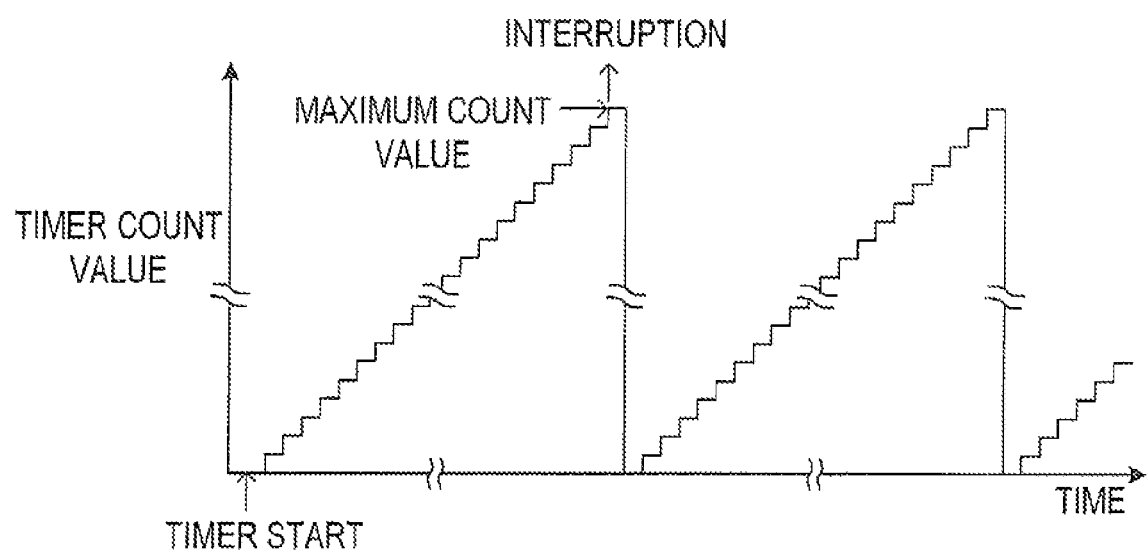
FIG. 3 is a time chart illustrating an operation of timer at a time of generating a random number.

As illustrated in FIG. 3, the timer 56 generates an interrupt signal to the microcomputer 50 when a count value of the sub clock reaches a predetermined value (the maximum count value in FIG. 3) after the initiation of the time measuring (after the timer 56 starts timing).

At S120 following S110, the microcomputer 50 increments (+1) the variable i. The process then proceeds to S130, wherein the microcomputer 50 determines the presence or absence of the interruption from the timer 56.

When there is no interruption from the timer 56 at S130, the process proceeds back to S120, wherein the variable i is incremented. When there is an interruption from the timer 56 at S130, the process proceeds to S140, wherein the value of the variable i is set as the random number. The random number generating process is then terminated.

As described above, in the random number generating process of the first embodiment, after the initiation of the time measuring by the timer 56 at S110 (after the timer 56 starts timing), the process at S120 is repetitively performed until the count value by the timer reaches the predetermined value and the timer interruption occurs. That is, the variable i is repetitively incremented until the count value of the sub clock reaches the predetermined value.

The microcomputer 50 is operated by the main clock from the main oscillator circuit 52. Therefore, the value of the variable i repetitively incremented at S120 correspond to the number of main clocks generated by the time that the timer interruption occurs after the timer 56 starts measuring time.

Accordingly, in the first embodiment, a time period until the timer interruption occurs after the timer 56 starts timing is measured by use of the main clock.

The value of the variable i, which is the result of the time measuring, varies in response to a cycle that the sub oscillator circuit 54 generates the sub clock (oscillation frequency). Because of the temperature characteristics of the sub oscillator circuit 54 (temperature dependence: high), the cycle of the sub clock generation (oscillation frequency) significantly varies in response to an ambient temperature.

Accordingly, the random number generated as described above greatly varies depending on an ambient temperature at a time of generating the random number, and so the random number can be employed as a random number for a battery pack authentication.

As described above, in the first embodiment, making the use of the difference in temperature characteristics of the main oscillator circuit 52 and the sub oscillator circuit 54 embedded in the microcomputer 50 of the battery charger 30, a time until the number of sub clocks outputted by the sub oscillator circuit 54 reaches the predetermined value is measured by use of the main clock, so that the random number is generated.

Therefore, in the first embodiment, the random number is generated by use of existing circuits embedded in the microcomputer 50, and there is no need to externally attach an A/D converter or a voltage control oscillator to the microcomputer 50, of which outputs vary in response to fluctuations of power-supply voltage, like a conventional device. Therefore, in the first embodiment, the function as the random number generating device is achieved extremely simply and at a low manufacturing cost by use of the random number generating process of the microcomputer 50.

Modified Example

As described above, in the first embodiment, a period until the count value of the sub clock by the timer 56 reaches the predetermined value is measured by the microcomputer 50 that operates in accordance with the main clock, and the random number is hence generated.

Figure 4:
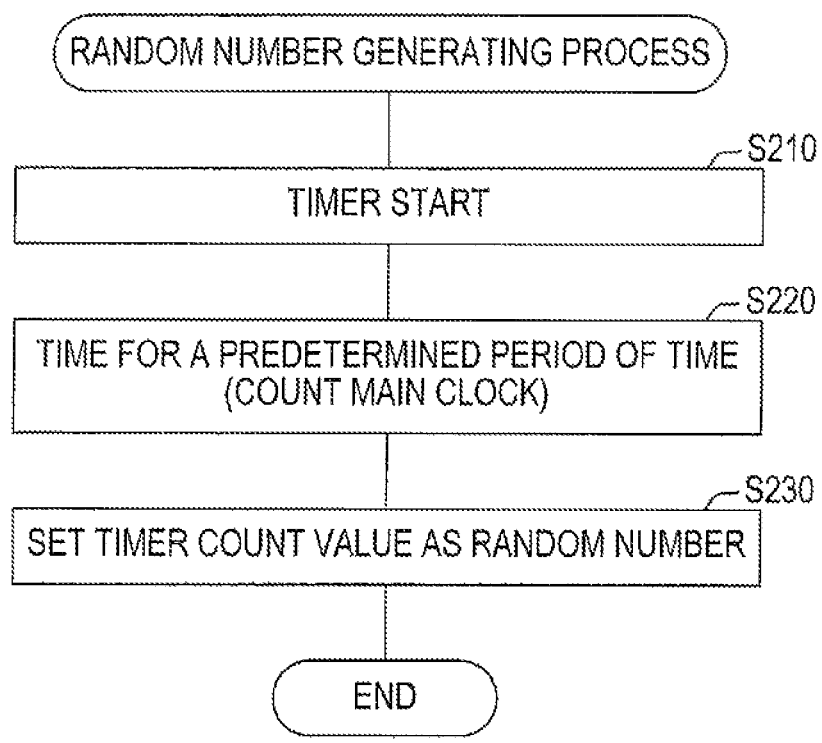
FIG. 4 is a flowchart illustrating a modified example of the random number generating process of the first embodiment.

However, the random number generating process may be modified as illustrated in FIG. 4. Specifically, as illustrated in FIG. 4, the microcomputer 50 commands the timer 56 to initiate counting sub clocks (S210). Then, the timer 56 counts main clocks and measures a predetermined period of time determined by the count value (S220). When the time measurement for the predetermined period of time is terminated, the count value of the sub clock by the timer 56 may be set as a random number (S230).

Also by the modified example illustrated in FIG. 4, it is possible to generate the random number by use of the difference in the temperature characteristics of the main oscillator circuit 52 and the sub oscillator circuit 54 of the microcomputer 50.

In the first embodiment, the microcomputer 50 of the battery charger 30 corresponds to an example of a microcomputer of the present invention, the main oscillator circuit 52 corresponds to an example of a first oscillator circuit of the present invention, the sub oscillator circuit 54 corresponds to an example of an electronic circuit of the present invention (more specifically, a second oscillator circuit).

Second Embodiment

A second embodiment will be described next.

Like the first embodiment, a random number generating device of the second embodiment is achieved as a function of the battery charger 30 that electrically charges the battery pack 10.

Figure 5:
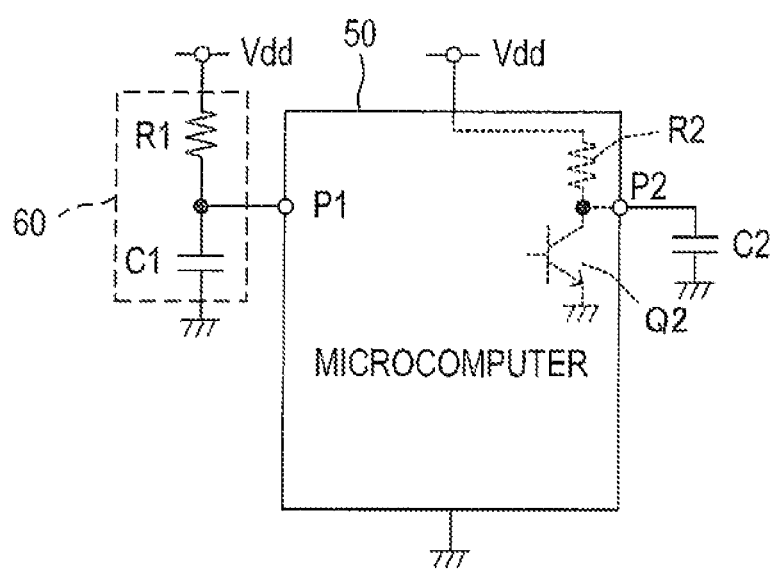
FIG. 5 is an explanatory view illustrating a port of a microcomputer and a connecting circuit to the port according to a second embodiment.

The second embodiment is different from the first embodiment in the following respects. That is, according to the first embodiment, the difference in the temperature characteristics of the main oscillator circuit 52 and the sub oscillator circuit 54 embedded in the microcomputer 50 is employed. Meanwhile, according to the second embodiment, as illustrated in FIG. 5, a charge-discharge circuit 60, which is configured with a resistor R1, and a capacitor C1, both connected to a port P1 of the microcomputer 50, is employed.

The charge-discharge circuit 60 is formed with a series circuit of the resistor R1 and the capacitor C1. One end of the resistor R1 is connected to a power-supply line Vdd of the microcomputer 50, the capacitor C1 is connected to ground of the microcomputer 50, and a connecting point of the resistor R1 and the capacitor C1 is connected to port P1 of the microcomputer 50.

In the charge-discharge circuit 60 configured as described above, when the port P1 of the microcomputer is controlled to a low level of voltage (ground potential), electric charge stored in the capacitor C1 is discharged, and, when the port P1 is open (disconnected, high impedance: Hiz), the capacitor C1 is electrically charged via the resistor R1.

The resistance value of the resistor R1 and the capacitance of the capacitor C1 vary with temperature. Therefore, a time constant when charging the capacitor C1 also varies with temperature.

In the second embodiment, the microcomputer 50 measures the rising characteristic of the voltage of the port P1 that is determined by the variations of the time constant at a time of charging the capacitor C1, so that a random number is generated.

The procedure of generating a random number by the microcomputer 50 will be explained herein below with reference to the flowchart illustrated in FIG. 6.

Figure 6:
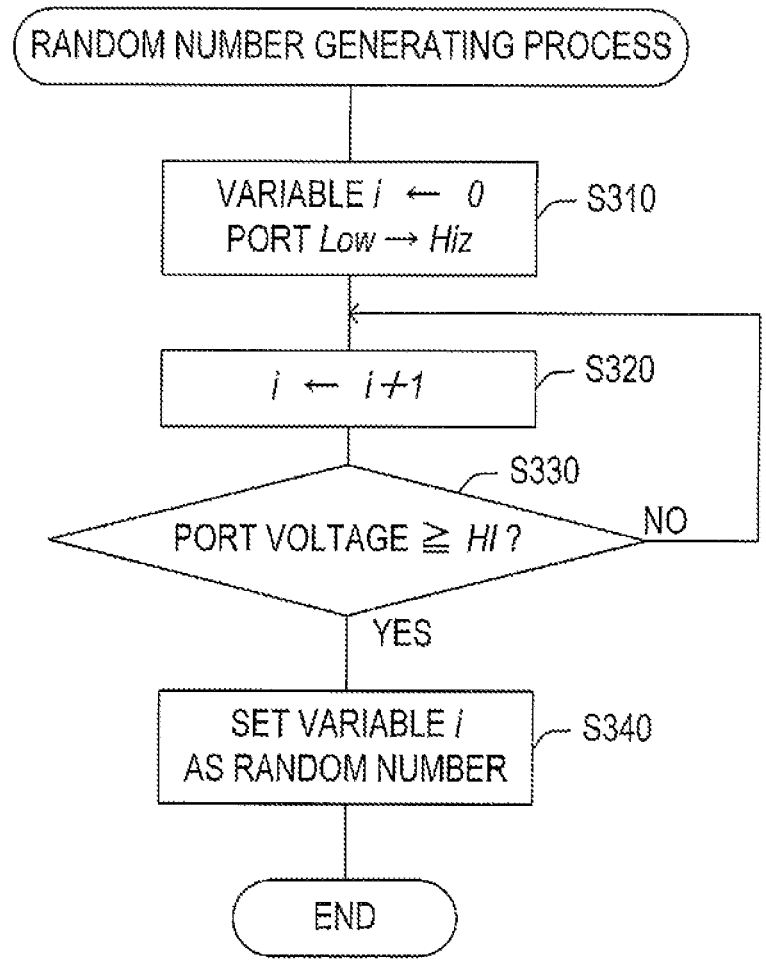
FIG. 6 is a flowchart illustrating a random number generating process implemented by the microcomputer of the second embodiment.

As illustrated in FIG. 6, once the microcomputer 50 (specifically CPU) initiates a random number generating process, the process proceeds to S310, wherein the microcomputer 50 sets a default value "0" to a variable i, and the microcomputer 50 switches the port P1 from the low voltage state to the high-impedance (Hi-Z) state so as to initiate charging the capacitor C1.

At S320 following S310, the microcomputer 50 increments (+1) the variable i. The process then proceeds to S330, wherein the microcomputer 50 determines whether or not the voltage value of the port P1 is a predetermined threshold voltage HI or more. When the microcomputer 50 determines that the voltage of the port P1 is less than the threshold voltage HI, the process proceeds back to S320, wherein the variable i is incremented.

When the microcomputer 50 determines at S330 that the voltage of the port P1 is the threshold voltage HI or more, the process proceeds to S340, wherein the variable i is set as a random number. The random number generating process is then terminated.

Figure 7:
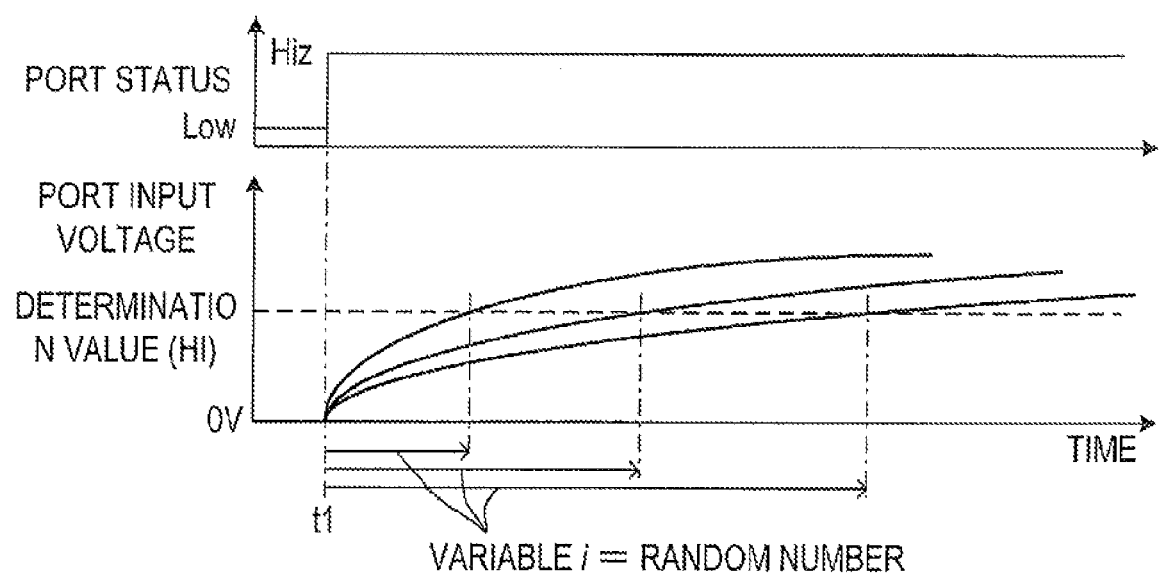
FIG. 7 is a time chart illustrating variations in voltage of the port of the microcomputer at a time of generating a random number.

As described above, as illustrated in FIG. 7, in response to the switching of the port P1 from the low voltage state to the high impedance (Hi-Z) state at S310, charging of the capacitor C1 is initiated (time point ti) and the voltage of the port P1 rises.

The period of time for the voltage of the port P1 to reach the threshold voltage HI varies with the time constant of the charge-discharge circuit 60 (in other words, temperature of the charge-discharge circuit 60).

In the second embodiment, the period of time for the voltage of the port P1 (in other words, voltage between both ends of the capacitor C1) to reach the threshold voltage HI from 0V is measured as the variable i by use of the main clock, and the value of the variable i is determined as the random number.

Accordingly, in the second embodiment, the battery charger 30 is provided with the charge-discharge circuit 60 which is configured with the capacitor C1 and the resistor R1 and is connected to the port P1 of the microcomputer 50. However, there is no need to externally attach an A/D converter or a voltage control oscillator to the microcomputer 50, like a conventional device. As a result, it is possible to generate a random number by use of a significantly simple circuit configuration.

In the second embodiment, a random number is generated by use of the charge-discharge circuit 60 connected to the port P1 of the microcomputer 50. Alternatively, as illustrated in FIG. 5, in the case where there is a port P2, which is connected to a power-supply line via a pull-up resistor R2 in the microcomputer 50, a random number may be generated by providing the port P2 with a capacitor C2 of which one end is connected to ground.

That is, the port P2, which is connected to the pull-up resistor R2 in the microcomputer 50, can be switched from the low voltage state to the high impedance (Hi-Z) state via a transistor Q2.

Therefore, in this case, by connecting the capacitor C2 to the port P2, the capacitor C2 and the pull-up resistor R2 are employed as a charge-discharge circuit, and it is possible to generate a random number in the same procedure as the case where the port P1 is connected to the charge-discharge circuit 60.

Modified Example

Figure 8:
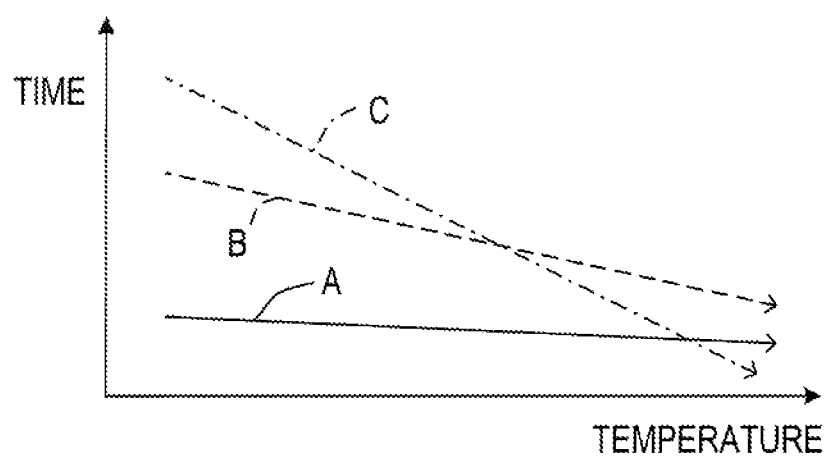
FIG. 8 is an explanatory view for explaining differences in temperature characteristics of a main oscillator circuit, a sub oscillator circuit of the microcomputer, and a charge-discharge circuit connected to the port of the microcomputer.

The cycle of the sub clocks outputted from the sub oscillator circuit 54 varies depending on temperature more than the cycle of the main clocks outputted from the main oscillator circuit 52 does, and the variation, of the cycle of the sub clocks relative to temperature changes is large, as illustrated in FIG. 8. In FIG. 8, the cycle of the main clocks is denoted with an alphabet A, and the cycle of the sub clocks is denoted with an alphabet B.

Meanwhile, the time constant at a time of charging the capacitor of the charge-discharge circuit constructed with the capacitor C1 and the resistor R1 (or the capacitor C2 and the pull-up resistor R2) (denoted with an alphabet C in FIG. 8) depends on the temperature characteristics of the resistor R1 (or the pull-up resistor R2), and the time constant varies at a variation greater than the variation of the cycle of the sub clocks relative to temperature change.

Accordingly, the sub oscillator circuit 54 and the timer 56 may be used to generate a random number by measuring a period of time of charging the capacitor C1 or the capacitor C2) until the voltage of the port P1 (or the port P2) reaches the threshold voltage HI from 0V.

Figure 9:
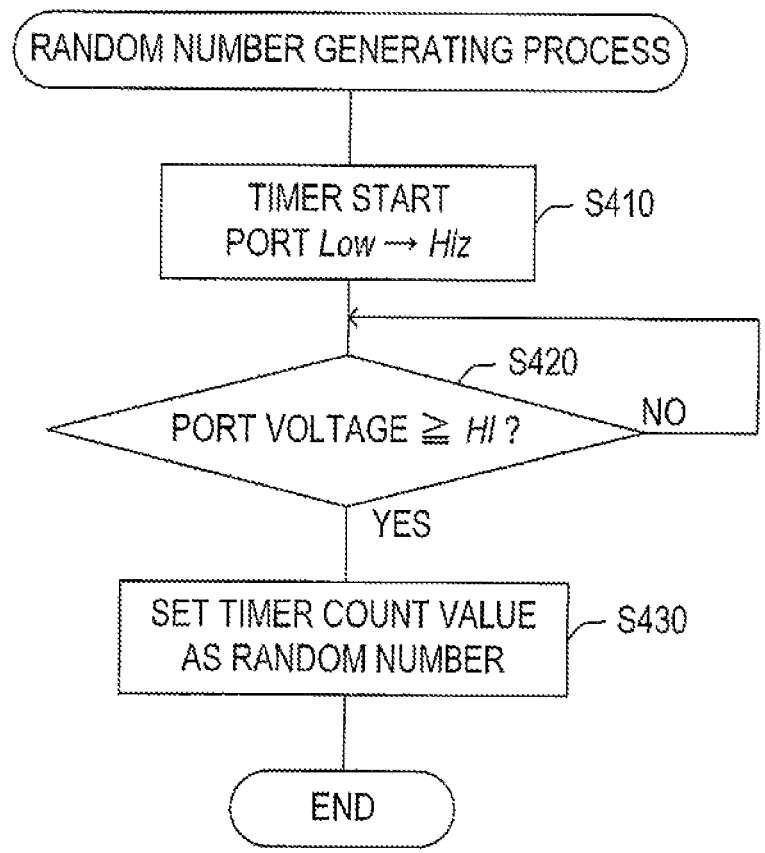
FIG. 9 is a flowchart illustrating a modified example of the random number generating process of the second embodiment.

Specifically, as illustrated in FIG. 9, in a random number generating process, the process proceeds to S410, wherein the microcomputer 50 commands the timer 56 to initiate counting sub clocks, and initiates charging the capacitor C1 (or the capacitor (22) by switching the port P1 (or the port P2) from the low voltage state to the high impedance (Hi-Z) state.

At S420 following S410, the microcomputer 50 waits for the voltage of the port P1 (or the port P2) to reach the predetermined threshold voltage HI by determining whether or not the voltage of the port P1 (or the port P2) is equal to or greater than the predetermined threshold voltage HI. When the port voltage becomes equal to or greater than the threshold voltage HI, the process proceeds to S430, wherein the microcomputer 50 reads out a count value obtained by the timer 56 and the count value is set as the random number.

Therefore, also by the random number generating process that is performed as described above, it is still possible to generate a random number by use of the charge-discharge circuit.

According to the second embodiment, the microcomputer 50 of the battery charger 30 corresponds to an example of the microcomputer of the present invention, the main oscillation circuit 52 corresponds to the example of the first oscillator circuit of the present invention, and the charge-discharge circuit 60 corresponds to the example of the electronic circuit of the present invention.

The present invention should not be construed as limited to the embodiments set forth above and can be achieved in any modes within the scope of the present invention.

For example, in the above embodiments, the battery charger 30 mounted with the battery pack 10 is embedded with the function as the random number generating device of the present invention. However, the random number generating device of the present invention can be applied to any devices in the same manner as the above embodiments as long as the device has a microcomputer. For example, the function as the random number generating device of the present invention can be embedded in the microcomputer 28 of the battery pack 10. Further, the random number generating device of the present invention can be achieved as a function of a microcomputer provided for an electric power tool or an electrically operated machine supplied with power from the battery pack 10.

In the second embodiment, a random number is generated by measuring a period of time of charging the capacitor C1 (or C2). Alternatively, for example, a random number may be generated by charging the capacitor C1 (or C2) to a predetermined voltage level or to a fully charged state and then by measuring a discharging period of time thereof until the capacitor voltage roaches a threshold voltage or less. The same effects as the second embodiment can be still obtained.

What is claimed is:

1. A random number generating device comprising:
   a microcomputer;
   a first oscillator circuit that has a predetermined temperature characteristic and is configured to generate a clock serving as a basis of a behavior of the microcomputer; and
   an electronic circuit that has a temperature characteristic being different from the predetermined temperature characteristic of the first oscillator circuit and is configured to operate in accordance with a command from the microcomputer,
   wherein the microcomputer is configured to measure an operating time of the electronic circuit based upon the clock generated by the first oscillator circuit and to generate a random number based upon a result of the measurement, and
   wherein the electronic circuit comprises a second oscillator circuit that is configured to exhibit a higher temperature dependence than the first oscillator circuit.

2. The random number generating device according to claim 1, wherein
   the microcomputer is configured to generate the random number by measuring a number of oscillations of the second oscillator circuit based upon the clock generated by the first oscillator circuit.

3. The random number generating device according to claim 1, wherein
   the microcomputer is configured to generate the random number by measuring, based upon the clock generated by the first oscillator circuit, a period of time until a number of oscillations of the second oscillator circuit reaches a predetermined value.

4. The random number generating device according to claim 1, wherein the random number generating device is mounted on at least one of an electric power tool, an electrically operated machine, a battery attached to the electric power tool or the electrically operated machine, and a battery charger for charging the battery.

* * * * *